March 23, 1948. H. G. HUGHEY 2,438,170
GAS HEATING TORCH
Filed Dec. 7, 1944
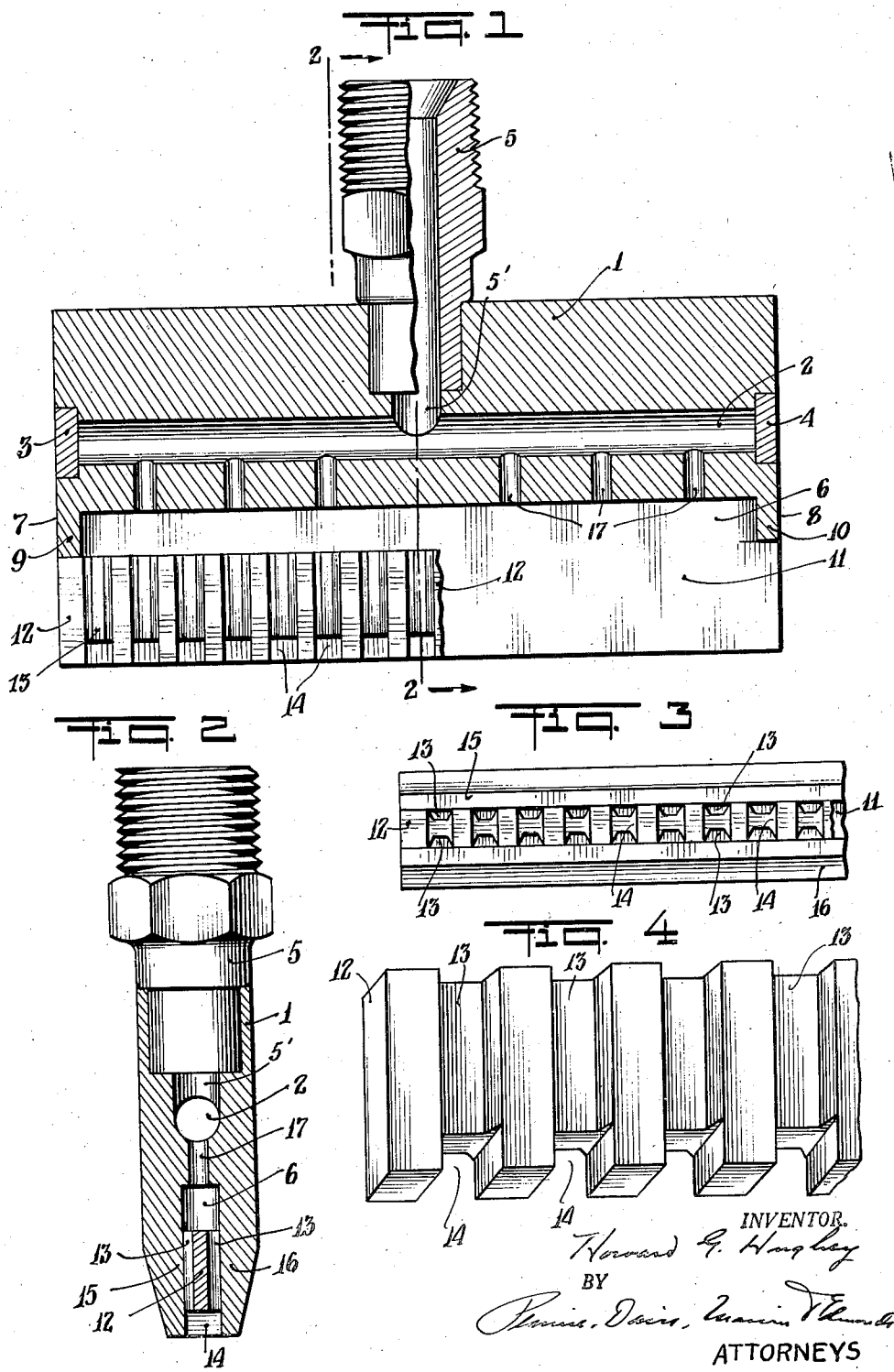
INVENTOR.
Howard G. Hughey
BY
ATTORNEYS Patented Mar. 23, 1948

2,438,170

UNITED STATES PATENT OFFICE 2,438,170

GAS HEATING TORCH

Howard G. Hughey, Fanwood, N. J., assignor to Air Reduction Company, Incorporated, a corporation of New York Application December 7, 1944, Serial No. 567,061

3 Claims. (Cl. 158—27.4)

This invention relates to gas heating torches, and particularly to the type intended for use in descaling or flame cleaning metal surfaces. Torches used for this purpose usually have a tip, of the bar or elongated block type, with drilled jet passages. In small tips, such as those sometimes used for propane gas, the jet passages are closely spaced and satisfactory results are not always obtained when they are drilled because the drills tend to drift toward one side or the other while cutting through the metal. Moreover, the drilling operation is expensive and there is no choice in the cross-sectional shape of the jet passages since they must necessarily have a circular cross-section.

According to this invention one or more rows of jet passages, opening through the discharge face of the block tip, are formed, not by drilling them, but by milling or otherwise forming slots in one or both side faces of an insert positioned in a longitudinal channel in the discharge face of the tip. The slots in each face are closed at their outer sides by the adjacent wall of the block. Transverse slots, milled or otherwise formed, in the lower edge portion of the insert at the foot of the jet passages are closed at their opposite ends by the side walls of the block to form a series of recesses into each of which the corresponding jet passage or passages discharge.

A torch tip embodying the invention is illustrated in the accompanying drawing, in which—

Fig. 1 is a longitudinal section through the tip, a portion of the insert being shown in side elevation;

Fig. 2 is a transverse vertical section taken on the line 2—2 of Fig. 1;

Fig. 3 is a bottom plan view of a portion of the tip looking directly at the discharge face of the tip; and Fig. 4 is an enlarged perspective view of a portion of the insert.

The tip of the torch comprises an elongated block 1. It has a longitudinal bore 2 which is closed at its ends, as shown at 3 and 4, to form a distributing chamber to which a gas mixture, such as propane and oxygen, may be admitted through a nipple 5 and a passage 5' in the block.

Just below the distributing chamber 2 there is a longitudinal channel 6 which may be milled or otherwise formed in the block. This channel terminates somewhat short of the end faces 7 and 8 of the block to provide walls 9 and 10 which close the ends of the channel. Below the channel 6, and forming a downward continuation of it, is another channel 11 of the same width as the channel 6, but which extends the entire length of the block. The channel 11 is adapted to receive and be entirely occupied by an elongated insert 12. This insert is a simple rectangular bar having a series of slots 13, milled or otherwise formed, in its opposite side faces so that they extend in a direction substantially at right angles to the discharge face of the block. The lower edge portion of the insert has a series of transversely extending slots 14, best shown in Fig. 4, each of which lies at the foot of one pair of slots 13 at opposite sides of the insert.

The insert is positioned in the channel 11 of the block until its upper face abuts against the lower edges of the two walls 9 and 10 at the ends of the channel 6. The slots 13 are closed at their outer sides by the side walls 15 and 16 of the block, as best shown in Fig. 2, to form two longitudinal rows of jet discharge passages. The upper wall of the insert forms with the channel 6 a second distributing chamber for the gas mixture which supplies it uniformly to the two rows of jet passages. This distributing chamber is placed in communication with the first distributing chamber 2 by control ports 17 connecting the two. These ports, as well as the distributing chamber 2 and the passage 5' in the block leading to it may all be drilled in the block, since their formation by a drilling operation presents no particular problem.

The insert is secured in the block by soldering at the ends, and the side walls of the block may be pressed tightly against the insert.

Each transverse slot 14 at the lower edge portion of the insert is closed at its opposite ends by the side walls of the block and forms a recess into which a pair of jet passages at opposite sides of the insert discharge, as clearly shown in Fig. 2, this being particularly desirable when propane is used for the fuel gas.

Instead of milling the slots 13 and 14 in the insert, they may be formed by molding the insert to the desired shape, or in any other suitable way. In any event, it is obvious that the necessity of drilling the jet passages is eliminated. Thus, the jet passages may be accurately formed as close together as desired and each passage may be given any desired cross-sectional shape. In the particular torch illustrated in the drawing, the slots 13 are so shaped that each jet passage at its inner side is narrower than at its outer side, as best shown in Figs. 3 and 4.

The slots, milled or otherwise formed in the insert, are cheaper and less difficult to form than drilled holes, thus reducing the cost of manufacture of the torch. Moreover, materials best suited for specific functions can be used. For instance, the body of the block may be made of copper to provide an advantageous wall against which the flame can burn and which will have the proper degree of heat conductivity. The insert may be made of brass, which lends itself well to the necessary machining. While the insert, if made of brass, presents brass walls at the top of the recesses 14 into which the jet passages are discharged, they are not in as intimate contact with the flames as are the side walls of the block. A further advantage resides in the fact that it is possible to drill the control ports 17 of a desired size quite independently of the shape and location of the jet passages. Likewise, the slots in the insert may be made to vary in shape and section throughout their length quite independently of the drilling in the body of the block.

I claim:

1. A gas torch having a tip comprising an elongated block, a longitudinal channel in the block of less length than the block, a second channel in the block below the first channel and extending into the block from the discharge face thereof, said second channel extending the entire length of the block, an insert completely occupying the second channel, the upper wall of said insert forming with said first channel a gas distributing chamber, said insert having a row of slots in a side face, said slots extending in a direction substantially at right angles to the discharge face of the block and being closed at their outer sides by an adjacent side wall of the block to form a longitudinal series of jet passages, all of said passages being in communication with said distributing chamber, and means for supplying gas to said distributing chamber.

2. A gas torch having a tip comprising an elongated block, a longitudinal channel in the discharge face of the block, an insert in said channel, the insert having a row of slots in a side face, said slots extending in a direction substantially at right angles to the discharge face of the block, said insert further having transverse slots in its lower edge portion each of which is at the foot of one of said first-named slots, the first-named slots in the insert being closed at their outer sides by an adjacent side wall of the block to form a longitudinal series of jet passages and the ends of said transverse slots being closed by the opposite side walls of the block to form recesses into which the jet passages discharge, a longitudinally extending gas distributing chamber in the block with which all of said jet passages communicate, and means for supplying gas to said distributing chamber.

3. A gas torch having a tip comprising an elongated block, a longitudinal channel in the discharge face of the block, an insert in said channel, said insert having a row of slots in each of its opposite side faces, said slots extending in a direction substantially at right angles to the discharge face of the block and the slots at one side of the insert lying directly opposite the corresponding slots at the opposite side to form a series of pairs of slots, a series of transversely extending slots in the lower edge portion of the insert each of which lies at the foot of a pair of said first-mentioned slots, the first-mentioned slots being closed at their outer sides by the adjacent side walls of block to form two longitudinal series of jet passages and said transverse slots being closed at opposite ends by the side walls of the block to form a series of recesses into each of which one pair of jet passages discharge, a longitudinally extending gas distributing chamber in the block with which all of said jet passages communicate, and means for supplying gas to said distributing chamber.

HOWARD G. HUGHEY.

REFERENCES CITED

The following references are of record in the file of this patent:

UNITED STATES PATENTS

| Number | Name | Date |
|--------|------|------|
| 1,647,137 | Kennedy | Nov. 1, 1927 |
| 1,729,149 | Brown | Sept. 24, 1929 |
| 1,742,607 | Machlet et al. | Jan. 7, 1930 |
| 2,228,114 | Hess | Jan. 7, 1941 |
| 2,252,320 | Hughey | Aug. 12, 1941 |
| 2,295,522 | Shorter | Sept. 8, 1942 |